No. 696,459. Patented Apr. 1, 1902.
A. D. LUNT.
MEANS FOR PREVENTING CREEPING OF METERS.
(Application filed Oct. 23, 1901.)
(No Model.)
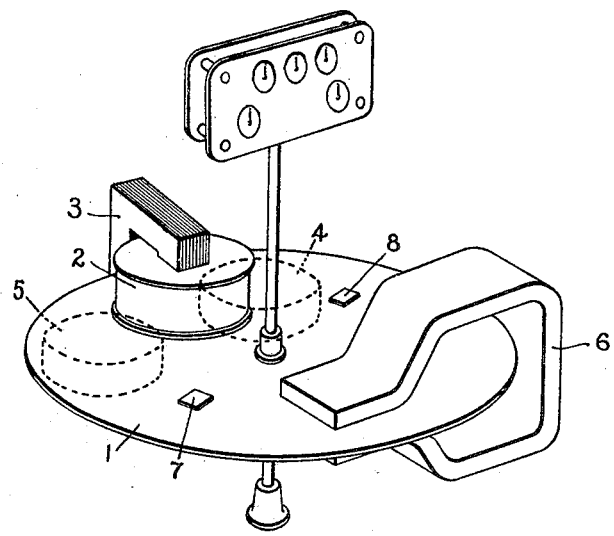
Witnesses.
John Ellis Glenn.
Benjamin B. Hull
Inventor.
Alexander D. Lunt.
by Albert G. Davis
Atty.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

MEANS FOR PREVENTING CREEPING OF METERS.

SPECIFICATION forming part of Letters Patent No. 696,459, dated April 1, 1902.

Application filed October 23, 1901. Serial No. 79,679. (No model.)

*To all whom it may concern:*

Be it known that I, ALEXANDER D. LUNT, a citizen of the United States, residing at Schenectady, county of Schenectady, State of New York, have invented certain new and useful Improvements in Means for Preventing Creeping of Electric Meters, (Case No. 2,502,) of which the following is a specification.

My present invention is intended to prevent the creeping of electric meters, and while more especially designed for use in connection with alternating-current meters is not, however, necessarily limited to use in that relation only.

In carrying my invention into practice the induced member of the meter is locally thickened in such a way that rotation of the member brings the thickened portion periodically through the alternating field of the meter. The currents induced in the thickened portion react upon the magnetic field to which they are due and produce a repulsion which opposes the passage of said thickened portion through the field. By suitable adjustment or proportioning of parts this repulsion effect may be made just sufficient to overcome any creeping tendency which may exist.

For a better understanding of my invention and its mode of application reference is to be had to the following description, taken in connection with the accompanying drawings, which represent one embodiment of my invention. The features of novelty which characterize my invention I have pointed out in the appended claims.

I have found that the purpose of my invention may be effected in practice by attaching to the induced member of an induction-meter a small piece of non-magnetic metal in such location that it may periodically pass into and out of the alternating magnetic field of the meter.

The drawing illustrates an arrangement embodying this device.

At 1 is indicated the disk of an induction-meter, upon which acts the shunt-field due to the shunt-winding 2 and its core 3. The series coils which coöperate with this shunt-field are in this case represented as being mounted beneath the disk and are indicated by dotted lines 4 5. The usual drag-magnet acting upon the disk is indicated at 6.

The meter so far described is intended merely as typical of any well-known alternating-current meter.

The invention is applied to the meter in this particular instance by attaching to the disk 1 a small piece of copper or other good conducting material 7, this piece being located so that by rotation of the disk it is brought periodically through the field due to the shunt-winding 2. To prevent mechanical unbalancing of the rotating element of the meter, another similar piece of metal 8 may be attached to the disk 1 in such a position as to mechanically balance the piece 7.

In explaining the operation of the anticreeping device it will be sufficient to point out the fact that as one of the pieces of metal 7 8 is caused to approach the field of the shunt-coil, due to creeping or other causes, induced currents are set up therein, which produce a repulsion between the piece of metal and the field. By suitably proportioning the size of the piece 7, as well as its companion 8, this repulsion effect may be made just sufficient to overcome the creeping tendency of the meter. The proper size and adjustment of these pieces of metal having been found, they may be secured to the disk 1 in any convenient manner—as, for example, by the use of some adhesive cement, by soldering or other metallic connection, or by any other convenient means. To readjust the anticreeping device, as may be rendered necessary upon change of conditions in the operation of the meter, it is only necessary to detach the pieces of metal which constitute the anticreeping device and replace them by pieces of metal either larger or smaller, as may be necessary.

What I claim as new, and desire to secure by Letters Patent of the United States, is—

1. In an electric meter, the combination with the rotating member, of an anticreeping device consisting of a piece of non-magnetic metal or other conductor superposed thereon.

2. In an induction-meter, the combination with the induced member, of an anticreeping device consisting of a small piece of copper or other good conducting non-magnetic metal superposed thereon.

3. In an induction-meter, an induced member having a locally-thickened portion of non-magnetic material arranged to pass periodically through the field of the meter as the induced member rotates.

4. The combination with the rotating member of an alternating-current induction-meter, of a locally-superposed piece of non-magnetic metal.

5. In an electric meter, the combination with the rotating member, of a plurality of pieces of metal or other good conducting material attached thereto in such positions as to balance each other.

6. The combination with an electric meter, of a piece of metal attached to the rotating member of the meter and operating to prevent creeping of the meter, and means for balancing any turning moment due to the weight of said piece.

In witness whereof I have hereunto set my hand this 17th day of October, 1901.

ALEXANDER D. LUNT.

Witnesses:
BENJAMIN B. HULL,
CHARLES STEINER.